(12) United States Patent
Wettling et al.

(10) Patent No.: US 6,710,140 B2
(45) Date of Patent: Mar. 23, 2004

(54) METHOD FOR PRODUCING POLYISOBUTENES

(75) Inventors: Thomas Wettling, Ekeren (BE); Dirk Borchers, Kapellen (DE); Wim Verrelst, Edegem (BE); Hans Peter Rath, Gruenstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/344,414

(22) PCT Filed: Aug. 11, 2001

(86) PCT No.: PCT/EP01/09318

§ 371 (c)(1),
(2), (4) Date: Feb. 19, 2003

(87) PCT Pub. No.: WO02/14385

PCT Pub. Date: Feb. 21, 2002

(65) Prior Publication Data

US 2003/0162918 A1 Aug. 28, 2003

(30) Foreign Application Priority Data

Aug. 16, 2000 (DE) .......................................... 100 40 618

(51) Int. Cl.[7] ................................................. C08F 2/40
(52) U.S. Cl. ....................... 526/84; 526/212; 526/237; 526/348.7; 528/485
(58) Field of Search .......................... 526/84, 237, 212, 526/348.7; 528/485

(56) References Cited

U.S. PATENT DOCUMENTS

| 4,213,001 A | | 7/1980 | Madgavkar et al. |
| 4,384,162 A | | 5/1983 | Vogel et al. |
| 4,433,197 A | | 2/1984 | Vogel et al. |
| 4,547,620 A | * | 10/1985 | Miyata et al. ............... 585/852 |
| 4,587,307 A | * | 5/1986 | Bronstert et al. ........... 525/362 |
| 6,180,730 B1 | * | 1/2001 | Sibtain et al. ................. 526/84 |

FOREIGN PATENT DOCUMENTS

| DE | 27 02 604 | 7/1978 |
| DE | 43 06 384 | 9/1994 |
| DE | 100 35 298 | 1/2002 |
| EP | 0 145 235 | 6/1985 |
| EP | 0 322 241 | 6/1989 |
| EP | 0 628 575 | 12/1994 |

OTHER PUBLICATIONS

Hackh's Chemical Dictionary, 4th ed., McGraw–Hill, N.Y., 347, 1969.*
H. Gueterbock: "B. herstellung hochmolekularer polyisobutylene" Polyisobutylen Und Mischpolymerisate, vol. 77, No. 104, pp. 77–104 1959.
Imre Puskas et al.: "The nature of the double bond in low molecular weight polyisobutylenes and 'polybutene' copolymers" J. Polymer Sci., Symposium No. 56, pp. 191–202 1976.

* cited by examiner

*Primary Examiner*—Fred Teskin
(74) *Attorney, Agent, or Firm*—Oblon, Spivak, McClelland, Maier & Neustadt, P.C.

(57) ABSTRACT

A process for the preparation of polyisobutylenes by cationic polymerization of isobutylene or isobutylene-containing hydrocarbon streams in the liquid phase in the presence of boron trifluoride acting as catalyst, the catalytic activity of boron trifluoride being partially or completely stopped by means of a solid deactivator following a given timelapse, which deactivator is an inorganic, anhydrous or hydrous oxygen compound of aluminum which is insoluble in the reaction mixture.

14 Claims, No Drawings

METHOD FOR PRODUCING POLYISOBUTENES

BACKGROUND OF THE INVENTION

The present invention relates to a process for the preparation of polyisobutylenes by cationic polymerization of isobutylene or isobutylene-containing hydrocarbon streams in the liquid phase in the presence of boron trifluoride acting as catalyst, the catalytic activity of the boron trifluoride being extinguished by means of a solid deactivator following a given timelapse.

DESCRIPTION OF THE BACKGROUND

High-molecular polyisobutylenes having molecular weights of up to several 100,000 dalton have been known for a number of years, and the preparation thereof is described for example in H. Gueterbock: "Polyisobutylen and Mischpolymerisate", pp 77 to 104, Springer Verlag, Berlin 1959. These conventional polyisobutylenes differ from the so-called highly reactive polyisobutylenes, which usually have average molecular weights of from 500 to 50000 dalton and a high content of terminal double bonds, so-called vinylidene groups, of preferably distinctly more than 60 mol %.

Such highly reactive polyisobutylenes are used as intermediate products for the synthesis of additives for lubricants and automotive fuels, as described, for example, in DE-A 2,702,604. For the preparation of these additives there are first of all produced, by reaction of the terminal double bonds of polyisobutylene with maleic anhydride, polyisobutylene/maleic anhydride adducts, particularly polyisobutenylsuccinic anhydrides, which are then caused to react with certain amines to form the finished additive. The content of terminal vinylidene groups in the molecule is a most important quality criterion for this polyisobutylene type, since the formation of the adduct with maleic anhydride mainly involves reaction of the terminal vinylidene groups, whereas the double bonds located further inside the macromolecules react either not at all or to a distinctly lesser extent, depending on their position in the macromolecule, when no halogens are added.

Theories on the realization of the terminal vinylidene groups and the isomerization of the terminal double bonds in isobutylene macromolecules to internal double bonds are described in the article by Puskas et al. in J. Polymer Sci.: Symposium No. 56, 191 (1976) or in EP-A 628,575. The protonations, deprotonations and molecular rearrangements which take place during this operation are balanced reactions in which the formation of more highly alkyl-substituted cations is thermodynamically assisted. The said reactions are usually assisted by traces of acid, particularly by the acid catalyst used for the polymerization itself, which is usually a Lewis acid.

Another quality criterion for polyisobutylenes used for the said purpose is their average molecular weight ($M_N$).

In addition, the molecular-weight distribution (dispersity, D) of the polyisobutylene macromolecules is a quality criterion for the purpose in mind, since the broader it is, ie, the greater the degree of scatter of the molecular weights of the polyisobutylene macromolecules, the less suitable the products frequently are for resolving the present problem.

The person skilled in the art already knows a number of processes for the preparation of reactive polyisobutylenes from isobutylene having average molecular weights and dispersities which satisfy the said requirements and in which boron trifluoride is used as catalyst.

Boron trifluoride is used in this case predominantly in the form of donor complexes, particularly with water, alcohols, phenols, carboxylic acids, carboxylic anhydrides, hydrogen fluoride, ethers or mixtures of these compounds. Boron trifluoride is an extremely effective catalyst even at low temperatures, alone or in the form of said complexes (cf eg DE-A 2,702,604, EP-A 145,235 or EP-A 322,241).

Thus if it is desired to stop the boron trifluoride-catalyzed conversion of isobutylene once a defined degree of conversion and/or a defined selectivity toward the polymeric products has been achieved, the boron trifluoride must usually be rapidly and completely deactivated. Such deactivation usually consists in decomposing the boron trifluoride with liquid substances or substances which are soluble in the reaction medium or converting it to other donor complexes such that it has virtually no more influence on the reaction process.

Suitable prior art substances for such complexing deactivation of boron trifluoride with organochemical deactivators in liquid phase are for example alcohols and acetonitrile (cf eg DE-A 4,306,384, EP-A 145,235).

A common feature of the known methods of deactivating boron trifluoride is that they necessitate the removal or purification of large amounts of liquids laden with boron trifluoride, its degradation products and/or organic compounds. When use is made of alcohols for such deactivation, reaction with the boron trifluoride may cause the formation of corrosive hydrogen fluoride, which necessitates the use of high-quality, expensive materials for construction of the apparatus used.

In view of this state of affairs, solutions to the present problem have already been developed using solid deactivators for boron trifluoride.

U.S. Pat. No. 4,384,162 proposes the abstraction of the boron trifluoride from the reaction solution by means of solid polyvinyl alcohol. The process suffers from the drawback, however, that it does not satisfy the requirements for polymerization of isobutylene, because boron trifluoride, despite adsorption thereof onto the polyvinyl alcohol, retains part of its activity, as a result of which undesirable oligomers may be formed as an after-effect.

U.S. Pat. No. 4,433,197 discloses the use of silica gel for the same purpose. However, here again, the deactivation achieved is insufficient. U.S. Pat. No. 4,213,001 even teaches the use of boron trifluoride/silica gel as catalyst for the oligomerization of 1-olefins, which indicates that boron trifluoride is still catalytically active after said adsorption.

The prior German Application having the file number 1,003,5298.7 already proposes, for this purpose, the use of a deactivator containing boron trifluoride-binding primary, secondary, tertiary and/or quaternary nitrogen atoms, which is insoluble in the reaction mixture. However, these deactivators are not always readily available.

SUMMARY OF THE INVENTION

It is thus an object of the present invention to provide a process for the synthesis of highly reactive polyisobutylene from isobutylene in the presence of boron trifluoride acting as catalyst, involving the use of a readily available and cheap solid deactivator for boron trifluoride which abstracts boron trifluoride from the reaction process more effectively than known deactivators of this kind.

This object is achieved by means of a process for the preparation of polyisobutylenes by cationic polymerization of isobutylene or isobutylene-containing hydrocarbon streams in the liquid phase in the presence of boron trifluoride acting as catalyst, the catalytic activity of the boron trifluoride being partly or completely extinguished by means of a solid deactivator following a given timelapse, which is characterized in that the solid deactivator used is an inorganic, anhydrous or hydrous oxygen compound of aluminum which is insoluble in the reaction mixture.

DETAILED DESCRIPTION OF THE PREFERRED EMBODIMENTS

By terminal vinylidene groups or terminal double bonds we mean the double bonds depicted below, whose position in the polyisobutylene macromolecule is defined by the general formula I 4 3 1 R

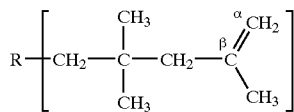

in which R stands for the remaining portion of the polyisobutylene macromolecule. The type and quantity of the double bonds present can be determined with the aid of $^3$C NMR spectroscopy, the two carbon atoms marked in formula I with α and β of the terminal double bond being identifiable in the $^{13}$C NMR spectrum by their signals derived from the chemical shift values of 114.4 and 143.6 respectively relatively relative to tetramethylsilane. The amount of terminal double bonds in relation to other types of double bonds is determined by calculating the ratio of the peak areas of the individual olefin signals to the total area integral of the olefin signals.

The highly reactive polyisobutylenes produced by the process of the invention generally have distinctly more than 60, preferably from 75 to 100 and more preferably from 80 to 95 mol % of vinylidene groups.

By average molecular weight we mean below the number average $M_N$ of the molecular weight, which can be determined, for example, with the aid of gel permeation chromatography, by ozonolysis or by means of vapor-pressure osmometry.

The highly reactive isobutylenes produced by the process of the invention generally have average molecular weights of from 300 to 50000, preferably from 500 to 30000 and more preferably from 500 to 25000 dalton.

For the preparation of highly active polyisobutylenes of isobutylene in the presence of boron trifluoride, normally either the required amount of preformed boron trifluoride complex solution or suspension is distributed in isobutylene or alternatively the catalyst is formed in situ by introducing gaseous boron trifluoride into a mixture or isobutylene and the complexing agent for the boron trifluoride. The catalytically active system comprising boron trifluoride and the complexing agent formed by one of said methods is referred to below as the "catalyst system."

For the purposes of the present invention suitable complexing agents for boron trifluoride are alcohols, preferably methanol and isopropanol (cf. EP-A 628,575) and tertiary ethers.

Usually the catalyst system is employed in amounts of from 0.05 to 1 wt %, based on the weight of isobutylene used. The overall reaction rate is usually dependent on the amount of catalyst system used but primarily on the molar ratio of the catalyst system used.

The isobutylene-containing starting material (referred to below as "isobutylene feedstock") may be pure isobutylene used in the synthesis step preceding the deactivation of boron trifluoride or alternatively mixtures of isobutylene with other hydrocarbons, the isobutylene content of such mixtures being advantageously not below 5 wt %. Preferably use is made of hydrocarbon mixtures having a high isobutylene content and a minimum butadiene content, for example (i) raffinate I, (ii) a partially hydrogenated $C_4$ stream from a steam cracker, (iii) a $C_4$ stream from an isobutane dehydration process or (iv) a $C_4$ stream from a refinery, for example an FCC unit.

The isobutylene feedstock can be converted to polyisobutylene in the presence of the catalyst system in one or more inert solvents. Suitable solvents, used individually or intermixed, are saturated hydrocarbons, for example butane, n-pentane, cyclopentane, n-hexane, methylcyclopentane, isooctane or methylcyclohexane, unsaturated hydrocarbons which are inert under the conditions of the reaction, such as 1-butylene, cis-2-butylene or trans-2-butylene, individually or intermixed, such as are present in, say, raffinate II, halogenated hydrocarbons such as dichloromethane, chloroform and other carbon halogen compounds having-suitable melting and boiling points.

The isobutylene feedstock can contain small amounts of impurities such as water, carboxylic acids or mineral acids without causing critical reductions in yield or selectivity during polymerization.

However it is convenient to avoid enrichment of these impurities in the reactor by removing such harmful substances from the isobutylene feedstock for example by means of adsorption onto solid adsorbents such as activated carbon, molecular sieves or ion exchangers.

Polymerization of the isobutylene can be carried out batchwise, semicontinuously or continuously. Reactors used for this purpose can be known types of reactors, such as tubular reactors, multi-tube fixed-bed reactors or stirred tanks. Preferably the manufacturing process is carried out in a loop reactor, ie a tubular reactor or shell-and-tube reactor with continuous recirculation of the reaction mixture, in which the ratio by volume of feed stream to recirculation stream may vary from 1:1 to 1:1000, preferably from 1:50 to 1:200. It is obvious that the feed rate corresponds to the rate of effluent flow when the polymerization reaction has achieved a state of equilibrium.

It is advantageous to ensure that all reactants are well mixed both when introducing preformed catalyst-reactant complexes into the reactor and when causing them to be produced in situ in the reactor, since high local and steady-state catalyst concentrations in the reactor can cause undesirable double-bond displacements. Good intermixture is achieved by the use of suitable internals such as baffle plates or by adjusting tube cross-sections such that at suitable flow rates there results an efficient turbulent flow of the reaction mixture in the reactor.

The residence time of isobutylene in the reactor can be 5 seconds to several hours. A residence time of from 1 to 6 minutes and more preferably of from 2 to 3 minutes is preferably used.

Polymerization is mostly carried out at temperatures below 0° C. Although isobutylene can be successfully polymerized to highly reactive polyisobutylene at much lower temperatures using this catalyst system, the process is preferably operated at temperatures ranging from 0 to −60° C., more preferably from 0 to −30° C. and very preferably from −5° C. to −20° C.

Advantageously, the polymerization reaction is carried out under isothermal conditions and, in the case of a continuous reaction, with adjustment of the isobutylene concentration in the reaction medium to a constant value under steady-state conditions. Theoretically, any steady-state isobutylene concentration can be used. Advantageously, an isobutylene concentration of from 0.2 to 50 and preferably of from 0.2 to 10 wt %, based on the overall polymerization mixture, is used.

Polymerization is generally carried out under atmospheric or slightly superatmospheric pressure. The use of an elevated pressure, particularly operation under the autogenous pressure of the reaction system (with maintenance of pressure), may be advantageous with regard to process engineering factors relating to subsequent process stages, but it usually has an insignificant influence on the results of polymerization.

Since the polymerization reaction is exothermic, the resulting heat is usually removed with the aid of cooling means which can be operated, for example, using liquid ammonia as cooling agent. Another heat dissipation variant is hot cooling, in which liberated heat is removed by evaporating isobutylene, other highly volatile constituents of the isobutylene feedstock and/or the optional fast solvent, which can be ethylene, ethane, propane or butane, by which means the temperature is kept constant.

The isobutylene conversion can theoretically be adjusted to any desired value. However it is obvious that the economical value of the process is subject to doubt at very low isobutylene conversions, whereas at very high isobutylene conversions of more than 99% the danger of undesirable side reactions, for example double-bond displacements and in particular the formation of undesirable oligomers, is always great. Usually the isobutylene conversion ranges from 20 to 99.5 and preferably from 90 to 99% for these reasons.

In the effluent of the reactor (referred to below as the "effluent") usually the major portion of boron trifluoride used is present in a free state or as a catalyst system, ie as a complex with the complexing agent originally added. However, the possibility cannot be ruled out that a reaction of boron trifluoride with other constituents of the reaction mixture has taken place, for example when use is made of isopropanol as complexing agent, to form an isopropyl borane. On account of the normally rare occurrences of such side reactions, this possibility will not be treated further in this description. Rather, for the sake of simplicity and in good approximation to the actual conditions, it may be assumed that the entire boron trifluoride that is used is still intact as such at the time the deactivation of the invention is carried out.

To effect the deactivation of boron trifluoride in the process of the invention, the effluent is treated with the deactivator.

Theoretically, deactivation can be carried out batchwise, semicontinuously or continuously. If the polymerization of the isobutylene with boron trifluoride is carried out continuously, the boron trifluoride in the effluent is preferably continuously deactivated with the deactivator.

Suitable deactivators are naturally occurring or synthetic inorganic oxygen compounds of aluminum (cf for example Holleman-Wiberg, Lehrbuch der Anorganischen Chemie, 81st–90th Edition, Walter de Gruyter Verlag, Berlin 1976, pages 647–650: "Sauerstoffverbindungen des Aluminiums").

Other suitable deactivators are mixtures of such inorganic oxygen compounds with each other and also mixtures of such oxygen compounds with other materials that are inert under the deactivation conditions, the amount of the inorganic oxygen compound being preferably more than 50% and more preferably more than 80% of the total weight of such a mixture with inert materials.

Preferably the inorganic oxygen compounds of aluminum used are the oxides and hydrated oxides of aluminum. Since the stoichiometric composition defined by the formula "$Al_2O_3$" represents a thermodynamically particularly preferred composition within the aluminum/oxygen system, this formula is usually used to denote aluminum oxides as such. It is also known, however, that aluminum oxides showing the stoichiometry "$Al_2O_3$" normally result from aluminum hydrates "$Al(H_2O)_n^{3+}$" in which n stands for an integer designating the number of the water molecules bonded by the $Al^{3+}$ ion to give a more or less fixed complex. By progressive condensation reactions in which water is liberated, there are formed from such hydrates, via hydrated oxide intermediates, products whose stoichiometric composition increasingly corresponds to the formula "$Al_2O_3$".

In the case of synthetic inorganic oxygen compounds of aluminum, such condensation processes frequently take place when hydrated "aluminum hydroxides" are precipitated from solutions of aluminum salts by the addition of bases. On such precipitates produced by forced precipitation but also on naturally occurring hydrous aluminum oxides, the degree of condensation can usually be increased further, especially by heating. In this way the stoichiometry of the inorganic oxygen compound of aluminum can frequently be adjusted to a desired extent. The temperature which is used during this operation, is usually a decisive factor on what surface properties are exhibited by the resulting product. At 400° C. for example there is formed from so-called γ-aluminum hydroxide a chemically comparatively reactive γ-aluminum oxide. However it is also known that heating of such a γ-aluminum oxide or hydrous aluminum oxides or aluminum hydrates at 1100° C. leads to the only slightly chemically reactive α-aluminum oxide.

Of the group comprising the aluminum oxides and hydrous aluminum oxides, particularly preferred deactivators are naturally occurring and synthetic γ-aluminum oxides.

Preferably use is made of inorganic oxygen compounds of aluminum which are hydrous and thus particularly effective as deactivators. Special preference is given to such materials whose water content is from 10 to 40 percent, based on the solids content of the inorganic oxygen compounds of aluminum. Very special preference is given to aluminum oxides having, based on their solids content, a water content of from 10 to 40 percent and a high surface area.

The required amount of the deactivators of the invention for boron trifluoride is governed by various factors, primarily:

the number of boron trifluoride-binding reactive sites on the surface of the deactivator used and the degree to which the content of boron trifluoride in the effluent is to be lowered.

In practice it is found that the originally boron trifluoride-free deactivator becomes laden with boron trifluoride up to the saturation point when there is an adequate boron trifluoride source in the form of effluent. Thus in other words its deactivation capacity usually drops in effect from a maximum down to zero. Then it should be replaced by fresh deactivator, or it must be regenerated. Thus the person skilled in the art must judge in what amounts he or she would like to use the deactivator of the invention.

In order to minimize the volume of the deactivator and thus the instrumental expenditure for the deactivation of boron trifluoride, those deactivators are preferred which possess a large reactive surface area for the purposes of the deactivation of the invention.

For the purpose of deactivating boron trifluoride the deactivator is brought into contact with the effluent in known manner.

For this purpose the deactivator can be stirred in bulk form into the effluent or conversely the effluent can be stirred into the bulk deactivator, preferably in excess. To this end, use is mainly made of contrivances which guarantee rapid and complete intermixing.

The deactivator is preferably caused to assume the form of a bed, taking economical aspects into consideration, and the effluent is passed through this bed.

In a preferred embodiment of the process of the invention, the deactivator is placed in a vertical reactor and the effluent preferably passed upwardly through the deactivator bed.

In another preferred embodiment, the process of the invention is carried out continuously. In particular, the deactivator is used as initial batch in two parallel absorption columns. The absorption columns are operated alternately: while deactivation is carried out in the first absorption column, the deactivator in the second absorption column is regenerated, or the absorption column laden with boron trifluoride is replenished with fresh deactivator.

Deactivation of boron trifluoride is preferably carried out at the temperature of polymerization, more preferably at from 0 to −30° C. and very preferably at from 0° C. to −25° C. Deactivation at a temperature other than the reaction temperature is possible; however, while the temperature is being raised or lowered for this purpose the reaction product can change in an undesirable manner as mentioned above.

The contact time of the effluent with the deactivator depends, inter alia, on the concentration of boron trifluoride in the effluent, the content of reactive centers in the deactivator and the degree to which the deactivator is occupied by boron trifluoride. Normally deactivation takes place immediately when the deactivator exhibits adequate capacity. When the deactivator is placed in a vertical bed and the effluent is passed through said bed, the necessary flow rate can be readily calculated and adjusted accordingly.

The phase ("eluate") remaining after deactivation contains polyisobutylene and also normally unreacted isobutylene, low-molecular polymers of isobutylene and any solvents used during the polymerization of the isobutylene.

From the eluate there may be removed small residual amounts of boron trifluoride, if desired by extraction with, say, alcohols such as methanol, or preferably by washing with water.

In another preferred embodiment of the process of the invention, the procedure adopted is as follows: the activity of the boron trifluoride is reduced in a first stage in substantially known manner, ie without the use of an inorganic, anhydrous or hydrous oxygen compound of aluminum, during which process normally from 0.001 to 10%, preferably from 0.5 to 8% and more preferably from 1 to 5% of the amount of boron trifluoride originally used is deactivated and, if necessary, removed from the reaction mixture, after which, in a second stage, the residual activity is extinguished using an inorganic, anhydrous or hydrous oxygen compound of aluminum. Preferably, the deactivator used in the first deactivation stage is a liquid deactivator, such as water, an alcohol, an amine, a caustic soda solution, or aqueous ammonia, and the resulting, usually liquid, phase is then separated. Due to the fact that the said pretreatment with some other deactivator yields a low residual content of boron trifluoride, smaller amounts of inorganic, hydrous or anhydrous oxygen compound of aluminum are required, so that the price thereof and the apparatus costs involved during use thereof can be viewed as being economically feasible compared with the known drawbacks of prior deactivation by a prior art method known to the man skilled in the art.

In a later stage of the workup process, the organic phase is advantageously separated, by distillation, into unconverted isobutylene, any solvent, the low-molecular polymers of isobutylene and the desired product polyisobutylene. The isobutylene, solvent and low-molecular polymers can be recycled to the polymerization stage independently or together. The desired polyisobutylene is usually removed from the degassifying stage as bottoms.

A special advantage of the deactivators of the invention over known deactivators is that boron trifluoride bound by the former has no more noticeable catalytic activity toward isobutylene under the conditions of the production of polyisobutylene.

Another advantage of the deactivators of the invention is that they are normally readily and inexpensively available. Thus the disposal of the spent deactivator is an economically justifiable alternative.

Since deactivation, particularly when carried out using organic deactivators, may also be generally carried out at the polymerization temperature of isobutylene, the refrigerative energy spent on establishing the low temperatures for polymerization can be recovered following deactivation particularly economically, for example via heat exchangers, prior to further workup of the effluent.

EXAMPLES

The average molecular weights ($M_N$) of the polymers-synthesized as per the examples were determined by means of gel permeation chromatography, polyisobutylenes containing defined known average molecular weights being used for calibration. From the resulting chromatograms the number average $M_N$ was calculated using the equation $$M_N = \frac{\sum C_i}{\sum \frac{C_i}{M_i}}$$

in which $C_i$ stands for the concentration of the individual polymer species i in the resulting polymer mixture and in which $M_i$ denotes the molecular weight of this individual polymer species i. The weight average $M_w$ of the resulting chromatograms was obtained using the formula $$M_W = \frac{\sum C_i M_i}{\sum C_i}.$$

The dispersity D was calculated from the ratio of the weight average of the molecular weight ($M_w$) and the number average of the molecular weight ($M_N$) using equation $$D = \frac{M_w}{M_N}.$$

The content of terminal vinylidene groups was determined with the aid of $^{13}C$ spectroscopy, the solvent used being deuterated chloroform and the standard being tetramethylsilane.

Example 1

Preparation of Highly Reactive Polyisobutylene

To prepare a polyisobutylene the process was carried out as described in EP-A 628,575, Example 1: the isobutylene feedstock used was a $C_4$ cut of the following composition:

| | |
|---|---|
| isobutane | 4.0 wt % |
| butane | 9.2 wt % |
| 1-butylene | 29.0 wt % |
| trans-2-butylene | 7.7 wt % |
| cis-2-butylene | 4.5 wt % |
| isobutylene | 45.4 wt % |
| butadiene | <50 ppm |
| water | ca 2 ppm |

Within an hour, 6000 g of the above $C_4$ cut were fed to the suction side of a loop reactor equipped with an integrated circulating pump having a tube diameter of 30 mm and a capacity of 1000 mL. 1,6-Butanol was added in a 1,6-fold molar amount based on the boron trifluoride. The reactor was cooled such that the temperature in the reaction medium was −15° C. The average residence time of the reaction medium in the reactor was approx. 6.6 minutes. Samples of the reactor contents were taken via a discharging device placed 2 cm in front of the inlet for the starting materials.

Examples 2 to 5

Deactivation and Workup

The deactivator was placed in a sealable, pressure-resistant sampling glass. A sample of 50 mL was added at −15° C. with vigorous mixing within a few seconds and stirring was continued at this temperature over a period of 30 minutes. The mixture was heated to +20° C. in the sealed sampling glass during the following 60 minutes with stirring by a magnetic agitator. The deactivator was then separated and the remaining organic phase washed with 167 g of water. Following separating of the aqueous phase, the solvent was removed by distillation, and the analytical data listed in Table 1 were determined on the bottoms.

The variables in Table 1 have the following meanings:

$BF_3$ "content of $BF_3$ in the sample": calculations were based on the weight of $BF_3$ added for the conversion of isobutylene,
U conversion in percent, based on isobutylene used,
A yield of polyisobutylene, based on isobutylene used,
Vin proportion of polyisobutylene having vinylidene double bonds in the total polyisobutylene yield,
$M_N$ average molecular weight (determined by means of gel permeation chromatography),
D dispersity,

TABLE 1

| | | Deactivator | | | | | | | Relative reduction in the content of |
|---|---|---|---|---|---|---|---|---|---|
| No. | $BF_3$ [mmol/l] | Substance | Amount [g] | U [%] | A [%] | Vin [%] | $M_N$ | D | inorganic fluoride [%] |
| 2 | 19.8 | aluminum oxide I[1] | 50 | 98 | 95 | 83.4 | 925 | 1.755 | 74 |
| 3 | 19.8 | aluminum oxide II[2] | 50 | 99 | 95 | 84.1 | 982 | 1.682 | 99 |
| 4 | 19.8 | aluminum oxide III[3] | 50 | 99 | 95 | 83.6 | 963 | 1.708 | 98 |

TABLE 1-continued

| No. | BF$_3$ [mmol/l] | Deactivator Substance | Amount [g] | U [%] | A [%] | Vin [%] | M$_N$ | D | Relative reduction in the content of inorganic fluoride [%] |
|---|---|---|---|---|---|---|---|---|---|
| 5 | 19.8 | — | — | 97 | 93 | 82.2 | 907 | 1.777 | 0 |
| 6 | 19.8 | water | 167 | 99 | 95 | 83.0 | 913 | 1.751 | 98 |

[1])PROCATALYSE A.A. 2–5 mm, Grade A (content of Al$_2$O$_3$ >93.5 %)
[2])MERCK AG, Aluminiumoxid 150, 0.063–0.2 mm, basic. Type T
[3])Alumina Woelm B - Super I Example 7

Continuous Deactivation

The effluent of Example 1 was passed through an insulated connecting pipe at a rate of 2 L/h at from −25° to −5° C. continuously from the synthesis reactor through a cooled glass column having a capacity of 100 mL and packed with 45 g of aluminum oxide type PROCATALYSE A.A. 2–5 mm, Grade A (Al$_2$O$_3$ content >93,5%). The eluate was collected in fractions of 1 liter each. The analysis gave the following impoverishment results with reference to inorganic fluoride in the eluates:

TABLE 2

| Eluate | Relative reduction in the content of inorganic fluoride [%] | Vin [%] | M$_N$ | D |
|---|---|---|---|---|
| 1st eluate | 72 | | | |
| 2nd eluate | 73 | 87.7 | 898 | 1.77 |
| 3rd eluate | 71 | | | |
| 4th eluate | 64 | | | |
| 5th eluate | 63 | 87.1 | 888 | 1.76 |
| 6th eluate | 46 | | | |
| 7th eluate | 54 | 87.4 | 903 | 1.73 |
| 8th eluate | 50 | | | |

Example 8

Regeneration of the Spent Deactivator

The spent aluminum oxide of Example 7 was then purged in the glass column with 500 mL of n-hexane for one hour at 20° C. A dry stream of nitrogen was then passed over the aluminum oxide thus treated for a further two hours in the glass column. Subsequent analysis indicated an amount of 1.4 wt % of carbon in the resulting aluminum oxide.

What is claimed is:

1. A process for the preparation of a polyisobutylene by cationic polymerization of isobutylene or isobutylene-containing hydrocarbon streams in the liquid phase in the presence of boron trifluoride acting as catalyst, the catalytic activity of boron trifluoride being partially or completely inhibited by means of a solid deactivator following a given timelapse, wherein the solid deactivator has the stoichiometry of Al$_2$O$_3$ which is insoluble in the reaction mixture.

2. A process for the preparation of a polyisobutylene by cationic polymerization of isobutylene or isobutylene-containing hydrocarbon streams in the liquid phase in the presence of boron trifluoride acting as catalyst, the catalytic activity of boron trifluoride being partially or completely inhibited in a first stage in known manner, and the residual activity is inhibited in a second stage by a solid deactivator that has the stoichiometry of Al$_2$O$_3$ which is insoluble in the reaction mixture.

3. The process as defined in claim 1, wherein the polyisobutylene product is a highly reactive polyisobutylene containing from 75 to 100 mol % of terminal double bonds.

4. The process as defined in claim 1, wherein the polyisobutylene product has an average molecular weight ranging from 300 to 50000 dalton.

5. The process as defined in claim 1, wherein the polymerization medium of the polymerization reaction contains a catalyst system containing boron trifluoride and one or more alcohols.

6. The process as defined in claim 5, wherein the catalyst system contains, as the alcohol, methanol or isopropanol.

7. The process as defined in claim 1, wherein the catalytic activity of boron trifluoride is continuously inhibited by means of the solid deactivator.

8. The process as defined in claim 1, wherein the solid deactivator having the stoichiometry of Al$_2$O$_3$ contains from 0 to 40 percent of water, based on its dry content.

9. The process as defined in claim 2, wherein the polyisobutylene product is a highly reactive polyisobutylene containing from 75 to 100 mol % of terminal double bonds.

10. The process as defined in claim 2, wherein the polyisobutylene product has an average molecular weight ranging from 300 to 50000 dalton.

11. The process as defined in claim 2, wherein the polymerization medium of the polymerization reaction contains a catalyst system containing boron trifluoride and one or more alcohols.

12. The process as defined in claim 11, wherein the catalyst system contains, as the alcohol, methanol or isopropanol.

13. The process as defined in claim 2, wherein the catalytic activity of boron trifluoride is continuously inhibited by means of the solid deactivator.

14. The process as defined in claim 2, wherein the solid deactivator having the stoichiometry of Al$_2$O$_3$ contains from 0 to 40 percent of water, based on its dry content.

* * * * *